(12) United States Patent
Shirakawa et al.

(10) Patent No.: US 11,421,620 B2
(45) Date of Patent: Aug. 23, 2022

(54) INJECTION CONTROL DEVICE

(71) Applicant: DENSO CORPORATION, Kariya (JP)

(72) Inventors: Makoto Shirakawa, Kariya (JP); Masashi Inaba, Kariya (JP); Hiroyuki Fukuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/357,313

(22) Filed: Jun. 24, 2021

(65) Prior Publication Data

US 2021/0404407 A1 Dec. 30, 2021

(30) Foreign Application Priority Data

Jun. 29, 2020 (JP) .............. JP2020-111591

(51) Int. Cl.
*F02D 41/22* (2006.01)
*F02D 41/20* (2006.01)
*F02D 41/40* (2006.01)

(52) U.S. Cl.
CPC .......... *F02D 41/221* (2013.01); *F02D 41/20* (2013.01); *F02D 41/40* (2013.01); *F02D 2041/2058* (2013.01); *F02D 2041/224* (2013.01); *F02D 2200/023* (2013.01); *F02D 2200/0616* (2013.01)

(58) Field of Classification Search
CPC ........ F02D 41/221; F02D 41/20; F02D 41/40; F02D 2041/2058; F02D 2041/224; F02D 2200/023; F02D 2200/0616
USPC ........................ 123/472, 478, 479, 480, 490; 701/103–105, 107
See application file for complete search history.

(56) References Cited

U.S. PATENT DOCUMENTS

2020/0284214 A1    9/2020   Inaba et al.

FOREIGN PATENT DOCUMENTS

JP          2016033343 A       3/2016

*Primary Examiner* — Hai H Huynh
(74) *Attorney, Agent, or Firm* — Posz Law Group, PLC

(57) ABSTRACT

An injection control device includes: an area correction unit that calculates an energization time correction amount when executing a current drive of the fuel injection valve to inject a fuel from the fuel injection valve; an estimation unit that independently calculates an estimated energization time correction amount; a comparison unit that compares the energization time correction amount c with the estimated energization time correction amount; and a first abnormality determination unit that determines that the energization time correction amount is abnormal.

7 Claims, 8 Drawing Sheets

FIG. 6

CHARGE COMSUMP AMOUNT Vs

| PEAK CUR Ipk | | I1 | I2 | ------------ | Im |
|---|---|---|---|---|---|
| TIME T | T0 | Vs01 | Vs02 | ------------ | Vs0m |
| | T1 | Vs11 | Vs12 | ------------ | Vs1m |
| | ⋮ | ⋮ | ⋮ | ⋮ | ⋮ |
| | Tn | Vsn1 | Vsn2 | ------------ | Vsnm |

M1

CHARGE SPEED V

| BAT VOLT VB | VB1 | VB2 | ------------ | VBh |
|---|---|---|---|---|
| CHARGE SPEED V | V1 | V2 | ------------ | Vh |

M2

INJECTION CONTROL DEVICE

CROSS REFERENCE TO RELATED APPLICATION

The present application claims the benefit of priority from Japanese Patent Application No. 2020-111591 filed on Jun. 29, 2020. The entire disclosure of the above application is incorporated herein by reference.

TECHNICAL FIELD

The present invention relates to an injection control device that controls opening and closing of a fuel injection valve.

BACKGROUND

An injection control device is used to inject fuel into an internal combustion engine by opening and closing a fuel injection valve. The injection control device opens the fuel injection valve that is electrically drivable by passing current to the fuel injection valve. In recent years, in response to a request for tightening regulations on the number of fine particles (i.e., PN that is Particulate Number), it is required to perform fine injection with high injection accuracy. The minute injection amount is greatly affected by fluctuations in the drive voltage of the injector.

SUMMARY

According to an example embodiment, an injection control device includes: an area correction unit that calculates an energization time correction amount when executing a current drive of the fuel injection valve to inject a fuel from the fuel injection valve; an estimation unit that independently calculates an estimated energization time correction amount; a comparison unit that compares the energization time correction amount c with the estimated energization time correction amount; and a first abnormality determination unit that determines that the energization time correction amount is abnormal.

BRIEF DESCRIPTION OF THE DRAWINGS

The above and other objects, features and advantages of the present disclosure will become more apparent from the following detailed description made with reference to the accompanying drawings. In the drawings:

FIG. 6 is a diagram schematically showing a charge consumption map and a charge speed map;

DETAILED DESCRIPTION

In order to solve the above-mentioned difficulties, the applicant has proposed a current area correction technique that detects the current gradient when the fuel injection valve is driven by current, and corrects the energization time according to the slope of the detected current. The inventors are considering inspecting whether or not the current area correction technique is normally implemented.

Thus, an injection control device is provided to be capable of inspecting whether or not the area correction of the current of the fuel injection valve is normally performed.

According to an aspect of the present embodiments, an area correction unit calculates an energization time correction amount by performing area correction on a current flowing through a fuel injection valve in current-driving the fuel injection valve to cause the fuel injection valve to inject fuel. The estimation unit independently estimates the energization time correction amount calculated by the area correction unit as the estimated energization time correction amount.

The comparison unit compares the energization time correction amount calculated by the area correction unit with the estimated energization time correction amount estimated by the estimation unit, and the first abnormality determination unit determines that the energization time correction amount calculated by the area correction unit is abnormal when the comparison result by the comparison unit is equal to or larger than a predetermined abnormal value. As a result, it is possible to inspect whether or not the area correction of the current of the fuel injection valve is normally performed.

Figure 1:
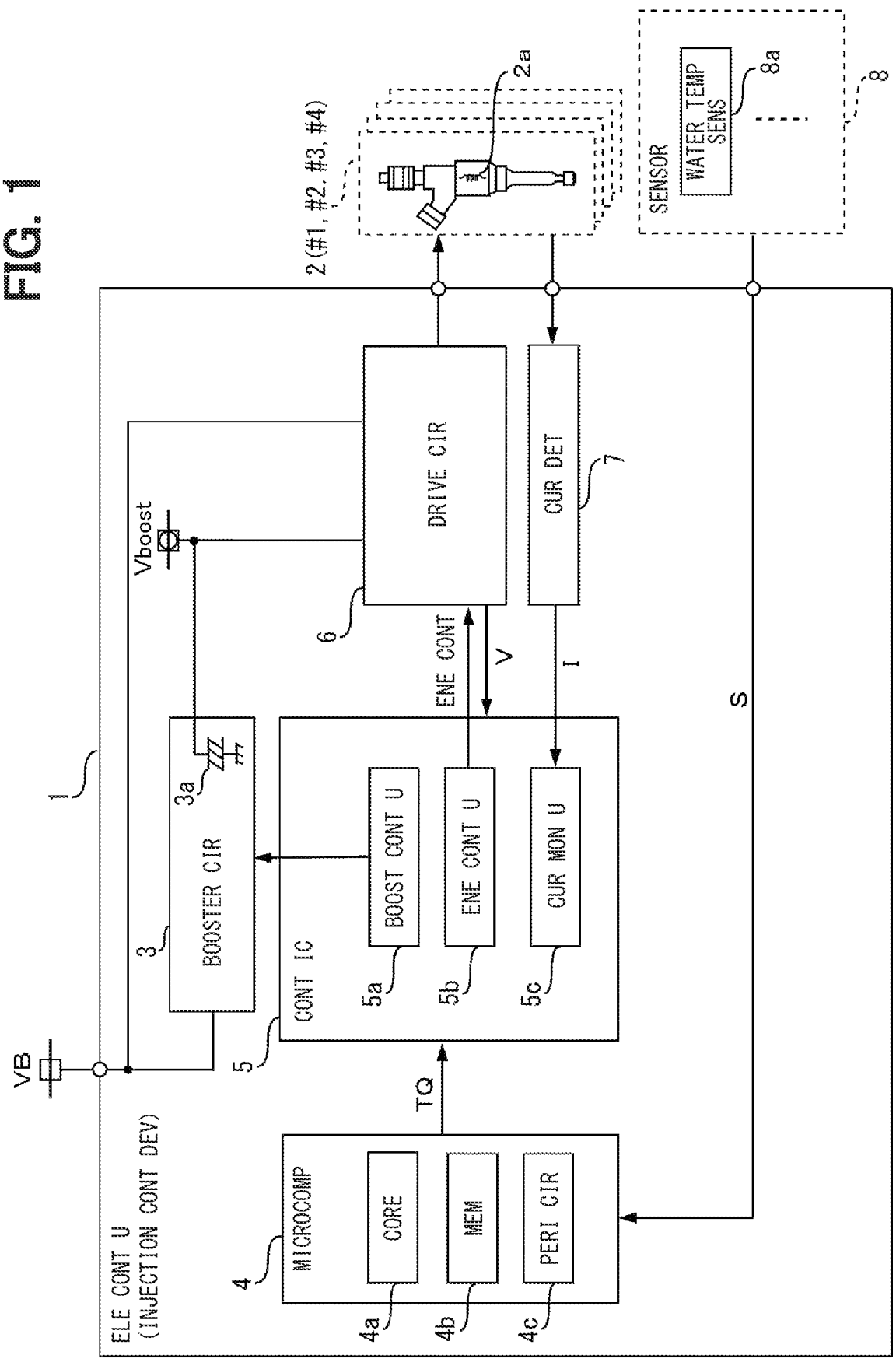
FIG. 1 is the electrical configuration diagram of an injection control device in a first embodiment.

Hereinbelow, an embodiment of an injection control device will be described with reference to the drawings. As illustrated in FIG. 1, an electronic control unit (ECU) 1 is configured as, for example, an injection control device which drives a solenoid fuel injection valve 2 (also called an injector). The fuel injection valve 2 directly injects fuel into an internal combustion engine mounted on a vehicle such as an automobile. Hereinbelow, a mode in which the present invention is applied to the electronic control unit 1 for gasoline engine control will be described. However, the present invention may also be applied to an electronic control unit for diesel engine control. FIG. 1 illustrates the fuel injection valves 2 for four cylinders. However, the present invention can also be applied to three cylinders, six cylinders, or eight cylinders.

As illustrated in FIG. 1, the electronic control unit 1 has an electrical configuration including a booster circuit 3, a microcomputer 4, a control IC 5, a drive circuit 6, and a current detector 7. The microcomputer 4 includes one or more cores 4a, a memory 4b such as a ROM and a RAM, and a peripheral circuit 4c such as an A/D converter, and performs various control operations in accordance with a program stored in the memory 4b and sensor signals S acquired from various sensors 8.

For example, the sensor 8 for a gasoline engine includes a water temperature sensor 8a for detecting the temperature of the cooling water of the engine. Although not shown, the other sensors 8 are a crank angle sensor that outputs a pulse signal each time the crank shaft rotates by a predetermined angle, a fuel pressure sensor that detects the fuel pressure at the time of fuel injection, and an air intake amount sensor that detects the intake air amount of the engine, an A/F sensor that detects the air-fuel ratio of an internal combustion engine, that is, an A/F value, and a throttle opening degree sensor that detects a throttle opening degree.

The microcomputer 4 calculates an engine speed from the pulse signal of the crank angle sensor and acquires the throttle opening degree from a throttle opening degree sensor. The microcomputer 4 calculates a target torque required for the internal combustion engine on the basis of the throttle opening, a hydraulic pressure, and the A/F value, and calculates a required injection quantity serving as a target on the basis of the target torque.

The microcomputer 4 calculates an energization command time Ti of an instruction TQ on the basis of the required injection quantity serving as a target and the fuel pressure detected by the fuel pressure sensor. The microcomputer 4 calculates injection start instruction time t0 for each of cylinders #1 to #4 on the basis of the sensor signals S input thereto from the various sensors 8 described above and outputs the instruction TQ for fuel injection to the control IC 5 at the injection start instruction time t0.

The control IC 5 is an integrated circuit device such as an ASIC and includes, for example, a logic circuit, a control main body such as a CPU, a storage unit such as a RAM, a ROM, or an EEPROM, and a comparator (all of which are not illustrated). The control IC 5 is configured to execute various control operations using hardware and software. The control IC 5 has functions of a boost control unit 5a, an energization control unit 5b1, and a current monitoring unit 5c.

Figure 2:
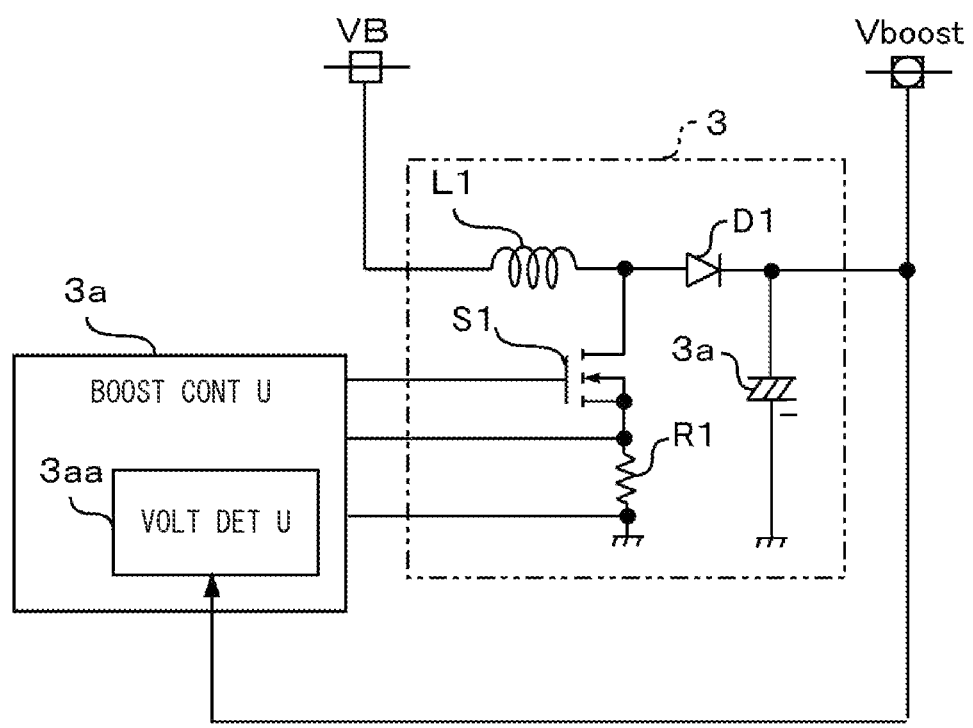
FIG. 2 is the electrical configuration diagram of a booster circuit.

As illustrated in FIG. 2, the booster circuit 3 includes a boost DC-DC converter including an inductor L1, a switching element S1, a diode D1, a current detection resistor R1, and a charging capacitor 3a which are connected to each other as illustrated in FIG. 2. The booster circuit 3 receives battery voltage VB input thereto, boosts the battery voltage VB, and charges the charging capacitor 3a as a charging unit with a boost voltage Vboost.

The boost control unit 5a boost-controls the battery voltage VB input to the booster circuit 3 by applying a boost control pulse to the switching element S1. The boost control unit 5a detects the boost voltage Vboost in the charging capacitor 3a of the booster circuit 3 using a voltage detection unit 3aa, charges the charging capacitor 3a with the boost voltage Vboost up to a full charge voltage, and supplies the boost voltage Vboost to the drive circuit 6. The charging capacitor 3a holds power to be supplied to the fuel injection valves 2 which directly inject fuel into the respective cylinders #1 to #4.

The battery voltage VB and the boost voltage Vboost are input to the drive circuit 6. Although not illustrated, the drive circuit 6 includes, for example, a transistor for applying the boost voltage Vboost to the solenoid coils 2a of the fuel injection valves 2 of the cylinders #1 to #4, a transistor for applying the battery voltage VB to the solenoid coils 2a, and a cylinder selection transistor which selects the cylinder to be energized.

The drive circuit 6 selects any of the cylinders #1 to #4 and selectively applies the boost voltage Vboost or the battery voltage VB to the solenoid coil 2a of the fuel injection valve 2 of the selected cylinder in accordance with energization control of the energization control unit 5b of the control IC 5, thereby driving the fuel injection valve 2 to cause the fuel injection valve 2 to inject fuel. When the energization control unit 5b causes the fuel injection valve 2 to perform partial-lift injection through the drive circuit 6, the energization control unit 5b executes an injection process of applying the boost voltage Vboost to the solenoid coil 2a of the fuel injection valve 2 and closing the fuel injection valve 2 before the valve is completely opened. When the fuel injection valve 2 performs normal injection, the energization control unit 5b applies the boost voltage Vboost to the solenoid coil 2a of the fuel injection valve 2 through the drive circuit 6 and then applies the battery voltage VB thereto to perform constant current control, and stops the energization after the elapse of the energization command time Ti. Accordingly, at the normal injection, an injection process of closing the fuel injection valve 2 after the valve is completely opened is executed.

The current detector 7 includes a current detection resistor connected to an energization path of the solenoid coil 2a of the fuel injection valve 2 of each of the cylinders #1 to #4. The current monitoring unit 5c of the control IC 5 includes, for example, a comparator and an A/D converter (both of which are not illustrated), and monitors a current flowing through the fuel injection valve 2 by the current detector 7.

Figure 4:
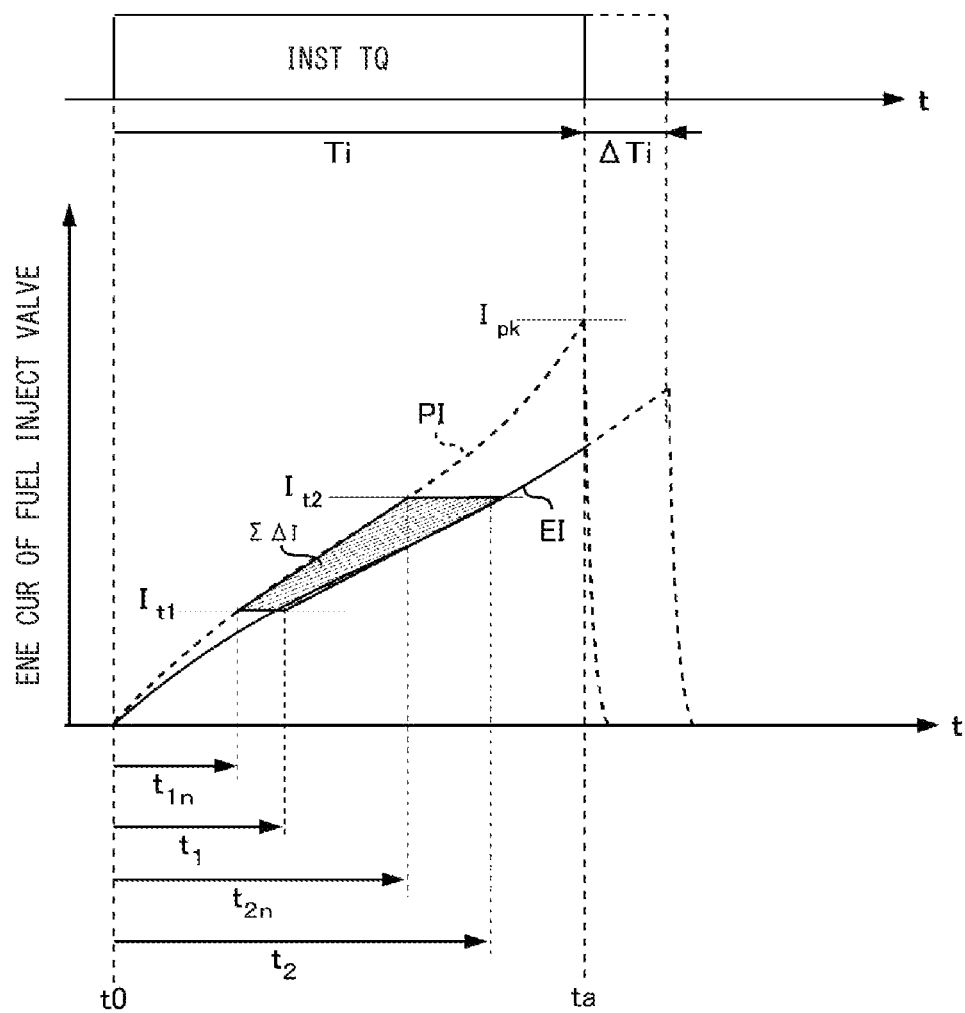
FIG. 4 is an explanatory diagram of a method of calculating an integrated current difference performed by a control IC.

FIG. 4 schematically illustrates the functional configuration of the microcomputer 4 and the control IC 5. When the core 4a executes a program stored in the memory 4b, the microcomputer 4 functions as an energization command time calculation unit 10, an estimation unit 11, a comparison unit 12, a first abnormality determination unit 13, a second abnormality determination unit 14, an energization command time calculation unit 10, and a stop instruction unit 15. The control IC 5 also has a function of an energization time correction amount calculation unit 5d serving as the area correction unit in addition to the functions of the boost control unit 5a, the energization control unit 5b, and the current monitoring unit 5c described above.

The energization command time calculation unit 10 of the microcomputer 4 has a function of calculating the required injection amount in each cylinder #1 to #4 in one cycle based on the sensor signals S of various sensors 8. The microcomputer 4 calculates the energization command time Ti of the instruction TQ of each cylinder, and commands the energization control unit 5b of the control IC 5. When the energization command time Ti is input on the control IC 5 side, the energization time correction amount calculation unit 5d calculates the energization time correction amount ΔTi for each injection and feeds it back to the energization control unit 5b, so that the energization command time Ti commanded by the microcomputer 4 is corrected in real time and to extend by the energization time correction amount ΔTi.

The microcomputer 4 has a function of the estimation unit 11 that independently estimates the energization time correction amount ΔTi calculated by the energization time correction amount calculation unit 5d of the control IC 5 as the estimated energization time correction amount ΔTie. For example, the estimation unit 11 estimates the inclination of the energization current EI from the matching map with the estimated charge amount Vbs of the charging capacitor 3a at the start of injection and the engine water temperature detected by the water temperature sensor 8a as parameters, and has a function for estimating the shortage of the injection amount from the energization command time Ti instructed to the control IC 5 by the microcomputer 4.

Then, the estimation unit 11 has a function of estimating the energization time correction amount ΔTi based on the estimated injection amount shortage, the slope of the target normal current profile PI, and the slope of the estimated energization current EI. In order to detect an operation abnormality of the control IC 5, the microcomputer 4 estimates the charge amount of the boost voltage Vboost of the charging capacitor 3a as the estimated charge amount Vbs without acquiring information on the charge amount of the boost voltage Vboost of the charging capacitor 3a from the control IC 5 as quantity Vbs.

The comparison unit 12 of the microcomputer 4 has a function of comparing the energization time correction amount ΔTi calculated by the energization time correction amount calculation unit 5d of the control IC 5 with the estimated energization time correction amount ΔTie estimated by the estimation unit 11. The first abnormality determination unit 13 of the microcomputer 4 has a function of determining the abnormality of the energization time correction amount ΔTi calculated by the energization time correction amount calculation unit 5d when the comparison result by the comparison unit 12 is equal to or greater than a predetermined abnormal value.

The microcomputer 4 includes a stop instruction unit 15 that gives a stop instruction to the control IC 5 when the energization time correction amount ΔTi is determined to be abnormal by the first abnormality determination unit 13. When the microcomputer 4 gives a stop instruction to the control IC 5 by the stop instruction unit 15, the energization time correction amount calculation unit 5d stops the area correction.

The second abnormality determination unit 14 of the microcomputer 4 has a function of determining an abnormality when the energization time correction amount ΔTi of the current for driving the fuel injection valve 2 continuously exceeds a predetermined abnormality value which is an upper limit for a predetermined time or more. When the energization time correction amount ΔTi is determined to be abnormal by the second abnormality determination unit 14, the microcomputer 4 controls the stop instruction unit 15 to instructs the control IC 5 to stop. When the microcomputer 4 gives a stop instruction to the control IC 5 by the stop instruction unit 15, the energization time correction amount calculation unit 5d stops the area correction.

<Explanation of Area Correction Control by Control IC 5>

Here, first, the area correction control by the control IC 5 will be described. When the battery voltage VB is applied to the electronic control unit 1, the microcomputer 4 and the control IC 5 are activated. The boost control unit 5a of the control IC 5 boosts the output voltage of the boost circuit 3 by outputting a boost control pulse to the boost circuit 3. The boost voltage Vboost is charged to a predetermined boost completion voltage that exceeds the battery voltage VB.

Figure 3:
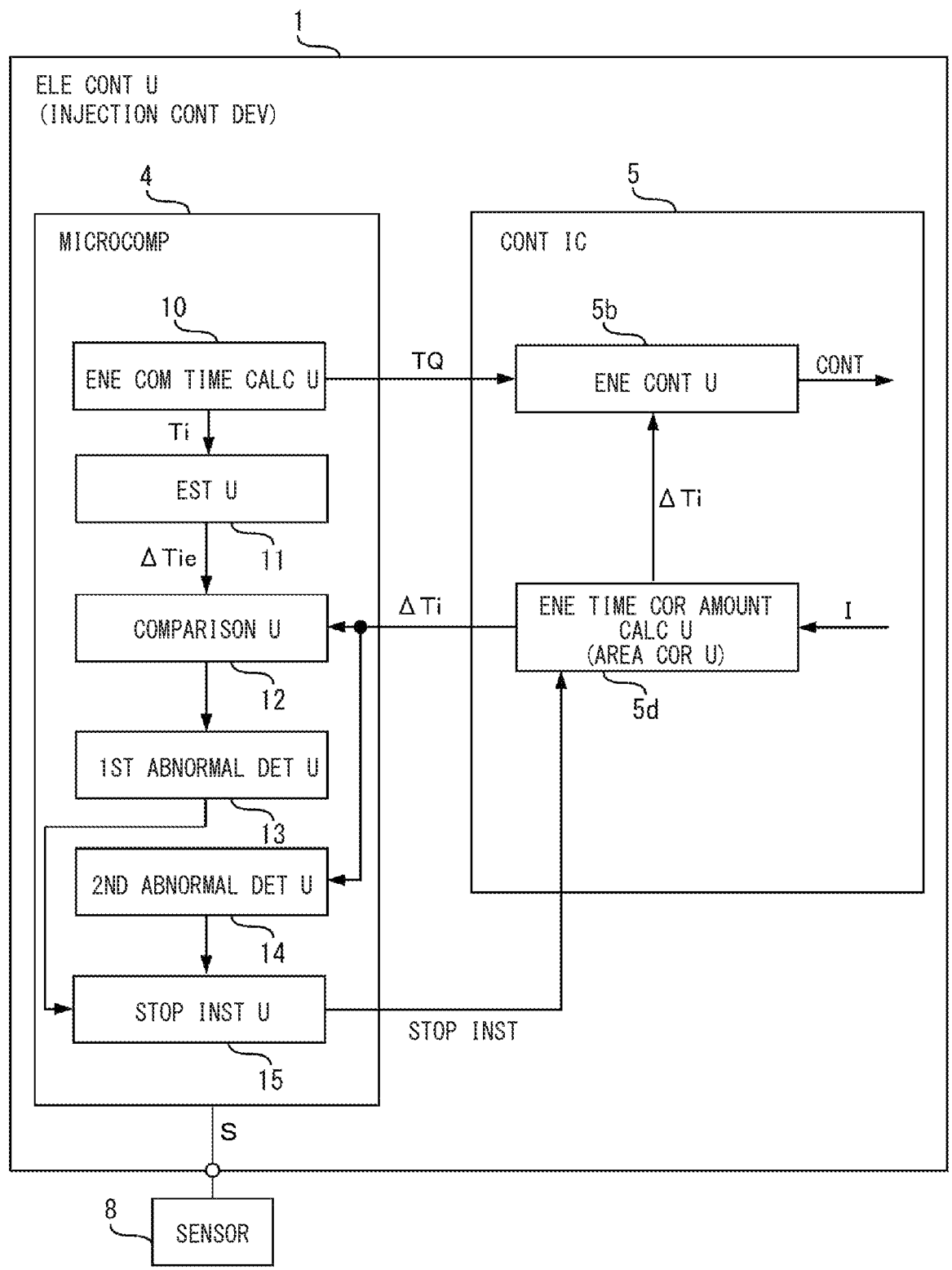
FIG. 3 is an explanatory diagram of information communicated between a microcomputer and a control IC.

As shown in FIG. 3, the microcomputer 4 calculates the required injection amount by the energization command time calculation unit 10 at the injection start instruction time t0 at which the energization command is executed, and also calculates the energization command time Ti of the instruction TQ, and then, outputs it to the energization control unit 5b of the control the IC 5. As a result, the microcomputer 4 commands the energization command time Ti via the instruction TQ to the control IC 5.

The control IC 5 stores, in an internal memory, the normal current profile PI serving as a target current to be passed to the fuel injection valve 2 and performs the peak current control so that the energization current reaches the target peak current $I_{pk}$ by applying the boost voltage Vboost to the fuel injection valve 2 on the basis of the normal current profile PI under control of the energization control unit 5b.

Figure 5:
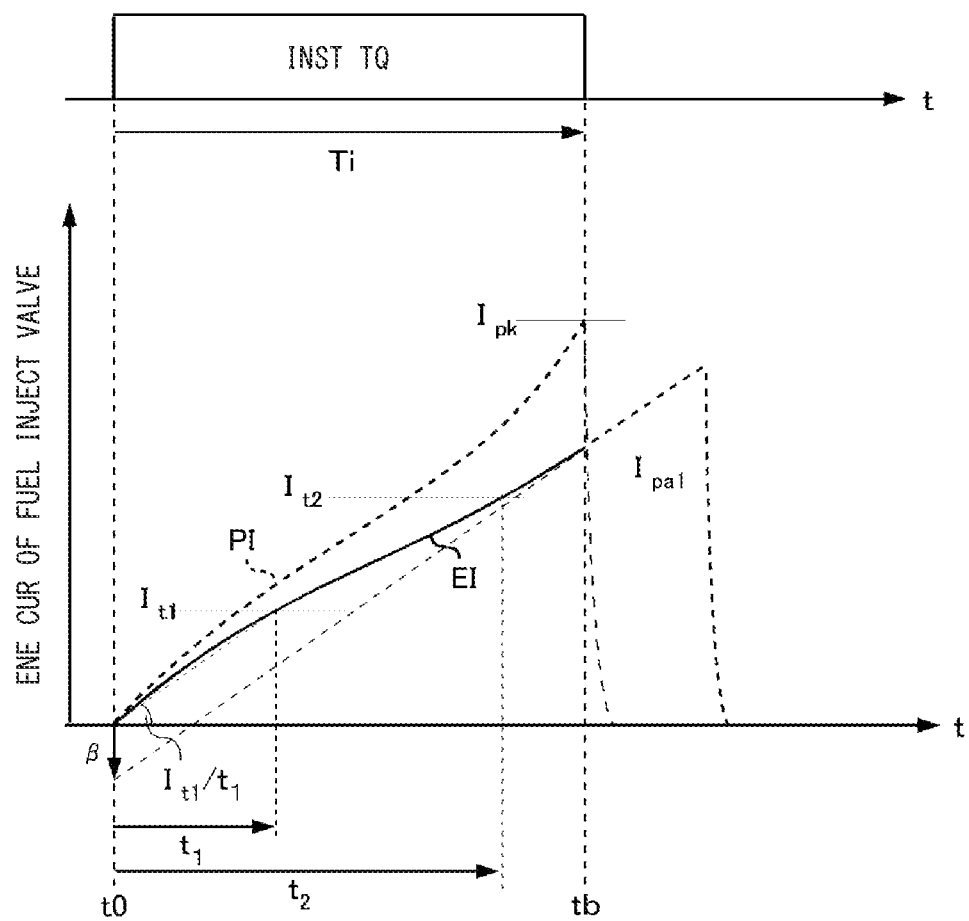
FIG. 5 is an explanatory diagram of a method of calculating a peak current estimated value performed by a control IC.

The control IC 5 continuously applies the boost voltage Vboost to between terminals of the fuel injection valve 2 until the energization current EI reaches the peak current $I_{pk}$ as the target indicated by the nominal current profile PI on the basis of the energization command time Ti of the instruction TQ. The energization current EI of the fuel injection valve 2 rapidly increases to open the fuel injection valve 2. As illustrated in FIG. 5, the energization current EI of the fuel injection valve 2 nonlinearly varies on the basis of the structure of the fuel injection valve 2. The gradient of the energization current EI becomes lower than the gradient of the nominal current profile PI due to various factors such as a peripheral temperature environment and aged deterioration, and the actual injection quantity becomes smaller than the normal injection quantity based on the nominal current profile PI.

Thus, under the condition that the boost voltage Vboost becomes lower than a predetermined voltage Vsta, the control IC 5 calculates the energization time correction amount ΔTi by executing the area correction control and feeds back the calculated energization time correction amount ΔTi to the energization control unit 5b in real time. Specifically, the energization time correction amount calculation unit 5d calculates and corrects the integrated current difference between the normal current profile PI and the energization current EI that actually energizes the fuel injection valve 2.

The actual integrated current difference corresponds to an area surrounded by nonlinear current curves. Thus, in order to calculate the integrated current difference in detail, an operation load tends to increase. Thus, as illustrated in FIG. 5 and represented by Equation (1), the area of a trapezoid with vertices (t, I)=$(t_{1n}, I_{t1})$, $(t_1, I_{t1})$, $(t_{2n}, I_{t2})$, $(t_2, I_{t2})$ may be regarded as the integrated current difference ΣΔI dependent on the area surrounded by the nonlinear current curves for simple calculation.

[Equation 1]

$$\Sigma \Delta I = \{(t_1-t_{1n})+(t_2-t_{2n})\} \times (I_{t2}-I_{t1}) \div 2 \quad (1)$$

The energization time correction amount calculation unit 5d calculates the integrated current difference ΣΔI between the nominal current profile PI from normal arrival time $t_{1n}$ to reach a current threshold $I_{t1}$ to normal arrival time $t_2n$ to reach a current threshold $I_{t2}$ and the energization current EI of the fuel injection valve 2 from arrival time $t_1$ to actually reach the current threshold $I_{t1}$ to arrival time $t_2$ to actually reach the current threshold $I_{t2}$. This enables the energization time correction amount calculation unit 5d to simply calculate the integrated current difference ΣΔI by detecting the arrival time $t_1$ to reach the current threshold $I_{t1}$ and the arrival time $t_2$ to reach the current threshold $I_{t2}$.

Further, the energization time correction amount calculation unit 5d calculates the insufficient energy Ei by multiplying the correction coefficient α by the integrated current difference ΣΔI as shown in the equation (2).

[Equation 2]

$$Ei = \Sigma \Delta I \times \alpha = \{(t_1-I_{1n})+(t_2-t_{2n})\} \times (I_{t2}-I_{t1}) \div 2 \times \alpha \quad (2)$$

The correction coefficient α is used to estimate, from the area of the trapezoid of the integrated current difference ΣΔI, the energy shortage Ei dependent on an actual integrated current difference and previously calculated according to, for example, the load characteristic of the fuel injection valve 2.

As illustrated in FIG. 6, the energization time correction amount calculation unit 5d calculates a peak current estimation value $I_{pa1}$ at a point in time when the energization command time Ti indicated by the instruction TQ elapses by calculating a current gradient from the injection start instruction time t0 of the injection command signal to the arrival time $t_1$ to reach the current threshold $I_{t1}$ and adding a correction coefficient β thereto as an intercept. At this time, the peak current estimation value $I_{pa1}$ may be calculated using Equation (3).

[Equation 3]

$$I_{pa1} = \frac{I_{t1}}{t_1} \times Ti + \beta \quad (3)$$

The correction coefficient β indicates an offset term for accurately estimating the peak current estimation value $I_{pa1}$ at application OFF timing and is previously calculated according to, for example, the load characteristic of the fuel injection valve 2. Although the current gradient from the injection start instruction time t0 of the injection command signal to the arrival time $t_1$ to reach the current threshold $I_{t1}$ is used in the first term of Equation (3), a current gradient from the injection start instruction time t0 to the arrival time $t_2$ to reach the current threshold $I_{t2}$ may be used in the first term of Equation (3).

Next, the energization time correction amount calculation unit 5d calculates the energization time correction amount ΔTi for compensating for the energy shortage Ei. Specifically, as represented by Equation (4), the energization time correction amount calculation unit 5d calculates the energization time correction amount ΔTi by dividing the calculated energy shortage Ei by the estimated peak current estimation value $I_{pa1}$.

[Equation 4]

$$\Delta Ti = Ei \div I_{pa1} \quad (4)$$
$$= \frac{\{(t_1 - t_{1n}) + (t_2 - t_{2n})\} \times (I_2 - I_1) \div 2 \times \alpha}{\frac{I_{t1}}{t_1} \times Ti + \beta}$$
$$= \frac{\{(t_1 - t_{1n}) + (t_2 - t_{2n})\} \times (I_2 - I_1) \times \alpha 2 \times t_1}{\{I_{t1} \times Ti\} + \beta \times t_1}$$

In this equation (4), α2=α/2. It is possible for the microcomputer 4 to simply calculate an extension time for compensating for the energy shortage Ei and dramatically reduce an operation amount by deriving the energization time correction amount ΔTi using Equation (4) dependent on the energy shortage Ei and the peak current estimation value $I_{pa1}$.

When the energization time correction amount calculation unit 5d outputs the calculated energization time correction amount ΔTi to the energization control unit 5b, the energization control unit 5b corrects the energization command time Ti to an energization command time Ti of the instruction TQ+the energization time correction amount ΔTi as an effective energization command time by timing tb when a current I detected by the current monitoring unit 5c reaches the peak current estimation value $I_{pa1}$. As a result, the energization command time Ti of the instruction TQ can be easily corrected, and the energization command time Ti can be extended in real time. Such a method eliminates the necessity of previously adjusting the energization command time Ti factoring in variations to prevent accidental fire and makes it possible to take measures against accidental fire while minimizing reduction in the fuel efficiency.

The energization time correction amount calculation unit 5d calculates the energization time correction amount ΔTi in a period from when the current I reaches the current threshold $I_{t2}$ to when the current I reaches the peak current estimation value $I_{pa1}$. Thus, the energization command time Ti can be corrected with sufficient time. Although a mode in which the energization time correction amount ΔTi is calculated using Equations (1) to (4) has been described, these equations merely show an example, and the present invention is not limited to this method.

<Processing Content of Microcomputer 4>

Hereinbelow, processing details of the microcomputer 4 which executes main control using the control IC 5 as described above will be described. The microcomputer 4 prepares a matching map, a charge consumption map M1 and a charge speed map M2 in advance in the memory 4b so as to match various characteristics of the fuel injection valve 2. The matching map is a map for estimating the slope of the actual energization current EI and calculating the estimated peak arrival time using the target peak current $I_{pk}$ at the time of injection, the estimated charge amount Vbs, and the detected engine water temperature as parameters.

This matching map shows that the estimated peak arrival time tends to be delayed if the target peak current $I_{pk}$ is large. Further, the lower the estimated charge amount Vbs, the later the estimated peak arrival time. Further, the lower the engine water temperature detected by the water temperature sensor 8a, the faster the estimated peak arrival time.

As illustrated in FIG. 6, the charge consumption map M1 shows a map for calculating the charge consumption amount Vs (i.e., Vs01, Vs02, . . . Vs0m: Vs11, Vs12, . . . Vs1m: Vsn1, Vsn2, . . . Vsnm) with charge consumption time T0, T1, . . . , Tn, and current value I1, I2, . . . Im of the peak current $I_{pk}$ as parameters. The charge consumption map M1 shows that the longer the charge consumption time T0, . . . Tn, the larger the charge consumption amount Vs. The charge consumption map M1 shows a tendency that the charge consumption amount Vs also increases as the current value I1, . . . Im of the target peak current $I_{pk}$ increases.

The charge speed map M2 shows a map for deriving the charge speed V (i.e., V1, . . . Vh) with the battery voltage VB (i.e., VB1, . . . VBh) as a parameter. The charge speed map M2 is a map showing a tendency that the charge speed V increases as the battery voltage VB increases.

As described above, the microcomputer 4 instructs the energization command time Ti through the instruction TQ to the control IC 5 at the injection start instruction time t0, and also executes the following process in parallel with this process.

<Processing at Injection Start Instruction Time t0>

The microcomputer 4 estimates the estimated peak current arrival time td at which the energizing current EI reaches the peak current $I_{pk}$ from the matching map by the estimation unit 11. At this time, the microcomputer 4 substitutes the target peak current $I_{pk}$ at the time of injection, the estimated charge amount Vbs, and the engine water temperature detected by the water temperature sensor 8a into the matching map, so that the gradient of the energizing current EI and the estimated peak current arrival time td can be estimated.

<Processing at Estimated Peak Current Arrival Time t0>

After that, when the estimated peak current arrival time td is reached, the microcomputer 4 ends energization in order to end the injection. At the time td, the microcomputer 4 calculates the charge consumption amount Vst01 as the voltage drop based on the time T from the injection start instruction time t0 to the estimated peak current arrival time td and the charge consumption map M1. At this time, the microcomputer 4 estimates the time T for consuming the boost voltage Vboost from the injection start instruction time t0 and the estimated peak current arrival time td, and substitutes the time T for the charge consumption map M1 to derive the charge consumption amount Vst01.

<Processing at the Next Injection Start Instruction Time te>

After that, at the next injection start instruction time te, the microcomputer 4 calculates the charge recovery amount Vst12 based on the charging time from the estimated peak current arrival time td to the injection start instruction time te where energization starts and the charge speed V of the charging speed map M2. At this time, the microcomputer 4 derives the charge speed V with reference to the charge speed map M2 with the battery voltage VB as a parameter, and can derive the charge recovery amount Vst12 by multiplying this charge speed V by the charge time.

Then, the microcomputer 4 can calculate the estimated charge amount Vbs2 at the next injection start instruction time te by subtracting the charge consumption amount Vst01 from the estimated charge amount Vbs0 at the injection start instruction time t0 and adding the charge recovery amount Vst12. In the present embodiment, the direct injection technique of directly injecting fuel into the cylinder is considered, alternatively, it can also be applied to port injection (i.e., PFI that is Port Fuel Injection) in which fuel is injected in front of the intake valve. At the time of port injection or fuel cut, the estimated charge amount Vbs2 may be regarded as a full charge.

The microcomputer 4 estimates the slope of the actual energization current EI of the next injection based on the estimated charge amount Vbs2 and the engine water temperature at the injection start instruction time te and the matching map. In this case, since the microcomputer 4 can estimate the temperature of the fuel injection valve 2 from the engine water temperature, it is possible to estimate the inclination of the actual energization current EI in consideration of the temperature dependence of the fuel injection valve 2. Then, the microcomputer 4 estimates the shortage of the injection amount from the next injection start instruction time te to the peak current estimation arrival time tf in which the energization command time Ti has elapsed.

Figure 7:
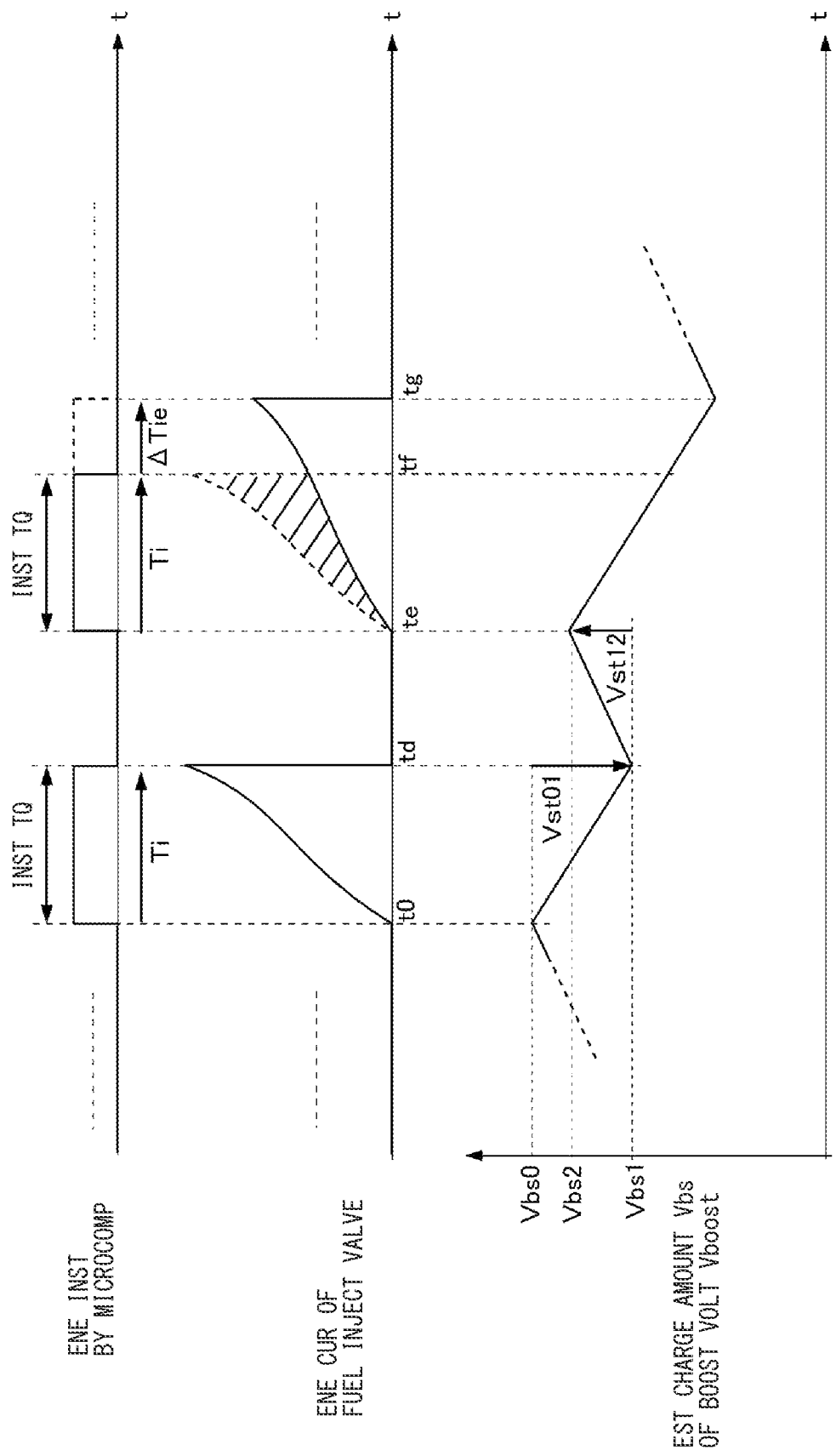
FIG. 7 is a diagram schematically showing a change in an energizing current of a fuel injection valve and a change in an estimated charge amount.

The shortage of the injection amount depends on the shortage of the integrated value of the energization current EI of the fuel injection valve 2 shown by a hatching in FIG. 7. The microcomputer 4 calculates the area Ss of the triangle of the integrated value of the energization current EI shown by a hatching in FIG. 8, and calculates the injection amount shortage by multiplying the area Ss of the triangle by the proportional coefficient.

The microcomputer 4 can derive the peak current $I_{pa2}$ when the energization command time Ti has elapsed from the injection start instruction time te by estimating the inclination of the actual energization current EI of the next injection, and calculates the area Ss of the triangle of the integrated value of the energization current EI by using the peak current $I_{pa2}$, the energization command time Ti, and the target peak current $I_{pk}$.

As a result, the microcomputer 4 can easily calculate the shortage of the injection amount, and the processing time can be significantly shortened. Although the feature of estimating the injection amount shortage by multiplying the area Ss of the triangle by the proportional coefficient is described, this estimation method is merely an example and may not be limited to this method.

Next, the microcomputer 4 estimates the estimated energization time correction amount ΔTie for compensating for the injection amount shortage by the estimation unit 11. The estimated energization time correction amount ΔTie indicates the extension time of the energization command time Ti estimated by the microcomputer 4 side and corresponding to the energization time correction amount ΔTi calculated by the control IC 5. The microcomputer 4 calculates the injection amount addition amount based on the estimated injection amount shortage, the inclination of the normal current profile PI, and the slope of the estimated energization current EI, and estimates the estimated energization time correction amount ΔTie.

Figure 8:
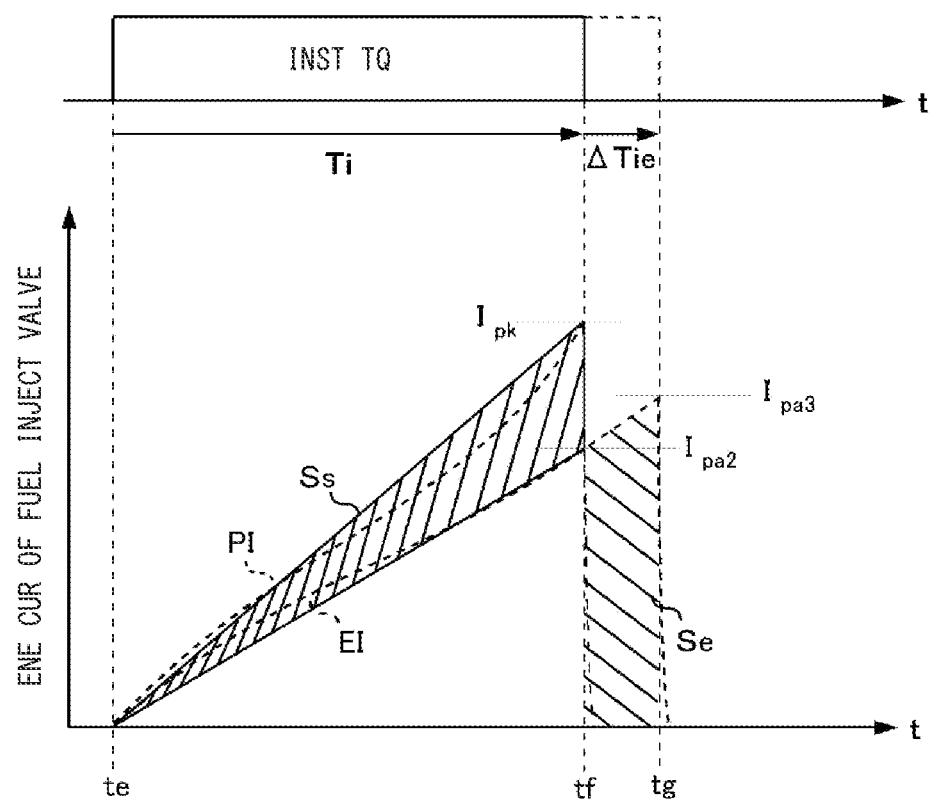
FIG. 8 is an explanatory diagram of a method of calculating an energization time correction amount performed by a microcomputer.

As shown by the hatching in FIG. 8, the microcomputer 4 obtains an injection amount addition amount depending on the area Se of the trapezoid from the time tf to the time tg, and calculates the estimated energization time correction amount ΔTie to compensate the shortage of the injection amount with this injection amount addition amount. The microcomputer 4 can derive the peak current $I_{pa3}$ at the time tg from the slope of the estimated energization current EI. Therefore, the microcomputer 4 can derive the trapezoidal area Se based on the peak currents $I_{pa2}$, $I_{pa3}$, and time tf, tg.

The feature is described such that the microcomputer 4 estimates the estimated energization time correction amount ΔTie by obtaining the injection amount addition depending on the area Se of the trapezoid, but the estimation method of the estimated energization time correction amount ΔTie is not limited to this method. Instead of the area of the trapezoid, it may be approximated by another polygon.

<Operation after Time tg>

Next, the microcomputer 4 inputs the energization time correction amount ΔTi from the energization time correction amount calculation unit 5d of the control IC 5 at the time tg. The microcomputer 4 uses the function of the comparison unit 12 for comparison by calculating the difference between the energization time correction amount ΔTi calculated by the energization time correction amount calculation unit 5d and the estimated energization time correction amount ΔTie estimated by the estimation unit 11. When the comparison result by the comparison unit 12 is equal to or greater than the first predetermined abnormal value, the microcomputer 4 determines at the first abnormality determination unit 1 that the energization time correction amount ΔTi calculated by the energization time correction amount calculation unit 5d is abnormal. After that, when the first abnormality determination unit 13 determines that the energization time correction amount ΔTi is abnormal, the microcomputer 4 instructs the control IC 5 to stop the area correction by the stop instruction unit 15, and stops the energization time correction function through the function of the energization time correction amount calculation unit 5d.

<Processing after the Next Injection>

The injection control is repeated even after the time tg. When the difference between the estimated energization time correction amount ΔTie and the energization time correction amount ΔTi is equal to or greater than the first predetermined abnormal value for a predetermined time or a predetermined number of injections, the microcomputer 4 may determine that the energization time correction function provided by the control IC 5 is abnormal, and output the diagnostic warning.

Further, the microcomputer 4 may input the energization time correction amount ΔTi from the control IC 5, and, when the energization time correction amount ΔTi continuously exceeds the second predetermined abnormal value for a predetermined time or more, the microcomputer 4 may determine the abnormality using the function of the second abnormality determination unit 14. In this case as well, the microcomputer 4 may instruct the control IC 5 to stop the area correction by the stop instruction unit 15 and stop the energization time correction function by the function of the energization time correction amount calculation unit 5d.

An ideal value of the first or second predetermined abnormal value described here changes due to aged deterioration of the fuel injection valve 2 and the drive circuit 6. Therefore, it may be preferable to prepare in advance a map showing the correlation between the travelling distance of the vehicle and the predetermined abnormal value with the travelling distance of the vehicle as an argument in the memory 4b. The microcomputer 4 can change the first or second predetermined abnormal value according to the travelling distance by referring to the memory 4b, and can adapt the predetermined abnormal value according to the travelling distance.

As described above, according to the present embodiment, the microcomputer 4 compares an estimated energization time correction amount $\Delta Tie$ estimated by the estimation unit 11 and the energization time correction amount $\Delta Ti$ calculated by the energization time correction amount calculation unit 5d of the control IC 5 using the comparison unit 12, and determines using the first abnormality determination unit 13 that the energization time correction amount $\Delta Ti$ calculated by the energization time correction amount calculation unit 5d is abnormal when the comparison result by the comparison unit 12 is equal to or greater than the first predetermined abnormal value. As a result, it is possible to inspect whether or not the area correction of the current of the fuel injection valve 2 is normally performed.

Other Embodiments

The present disclosure is not limited to the above-described embodiments, i.e., may be modified or expanded in the following manner.

The energization current EI that actually flows through the fuel injection valve 2 changes non-linearly before and after reaching the peak current. Thus, it is preferable to simply calculate the integrated current difference by approximately calculating the integrated current using a polygon such as a triangle, a rectangle, or a trapezoid. This makes it possible to dramatically reduce the operation amount. The second abnormality determination unit 14 may be provided as needed.

In the above embodiments, the present invention is applied to direct injection that directly injects fuel into a combustion chamber of the internal combustion engine. However, the present invention is not limited thereto and may be applied to port injection that injects fuel in front of a known intake valve.

The means and/or the functions provided by the microcomputer 4 and the control IC 5 can be provided by software recorded in a substantive memory device and a computer executing the software, software only, hardware only, or a combination thereof. For example, when the control device is provided by an electronic circuit as hardware, the control device can include a digital circuit including one or more logic circuits or an analog circuit. Further, for example, when the control device executes various control operations using software, a program is stored in the storage unit, and the control main body executes the program to implement a method corresponding to the program.

The embodiments described above may be combined. In addition, the reference numerals in parentheses described in the claims simply indicate correspondence to the concrete means described in the embodiments, which is an example of the present disclosure. That is, the technical scope of the present invention is not necessarily limited thereto. A part of the above-described embodiment may be dispensed/dropped as long as the problem identified in the background is resolvable. Any aspects conceivable within the nature of the invention specified by wordings described in claims can also be regarded as embodiments.

The present invention has been described in accordance with the embodiment described above. However, it is to be understood that the present invention is not limited to the embodiment and structure. The present disclosure encompasses various modifications and variations within the scope of equivalents. In addition, various modes/combinations, one or more elements added/subtracted thereto/therefrom, may also be considered as the present disclosure and understood as the technical thought thereof.

REFERENCE SIGNS LIST

In the drawing, 1 is an electronic control device (injection control device), 2 is a fuel injection valve, 5d is an energization time correction amount calculation unit (area correction unit), 11 is an estimation unit, 12 is a comparison unit, and 13 is a first abnormality determination unit, 14 indicates a second abnormality determination unit, and 15 indicates a stop instruction unit.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An injection control device comprising:

an area correction unit that calculates an energization time correction amount by executing an area correction of current flowing through a fuel injection valve when executing a current drive of the fuel injection valve to inject a fuel from the fuel injection valve;

an estimation unit that independently calculates an estimated energization time correction amount, which corresponds to the energization time correction amount calculated by the area correction unit;

a comparison unit that compares the energization time correction amount calculated by the area correction unit with the estimated energization time correction amount calculated by the estimation unit; and a first abnormality determination unit that determines that the energization time correction amount calculated by the area correction unit is abnormal when a comparison result by the comparison unit is equal to or greater than a first predetermined abnormal value, wherein when the first abnormality determination unit determines that the energization time correction amount is abnormal, a fuel injection control is stopped.

2. The injection control device according to claim 1, further comprising:
a second abnormality determination unit that determines that an abnormality occurs when the energization time correction amount of the current for driving the fuel injection valve continuously exceeds a second predetermined abnormality value for a predetermined time or more.

3. The injection control device according to claim 2, wherein:
a stop instruction unit that instructs the area correction unit to stop an area correction when the second abnormality determination unit determines that the energization time correction amount is abnormal.

4. The injection control device according to claim 2, wherein:
when the first abnormality determination unit determines that the energization time correction amount is abnormal, a diagnostic warning is output.

5. The injection control device according to claim 1, wherein:
the estimation unit estimates a slope of an energization current based on a matching map with an estimated charge amount at a start of injection and an engine water temperature as parameters, and calculates an injection amount shortage based on an estimated slope of the energization current and an energization command time; and the estimation unit calculates the estimated energization time correction amount based on an estimated injection amount shortage, a slope of a normal current profile which is a target current of the energization current, and the estimated slope of the energization current.

6. The injection control device according to claim 1, further comprising:
a stop instruction unit that instructs the area correction unit to stop an area correction when the first abnormality determination unit determines that the energization time correction amount is abnormal.

7. The injection control device according to claim 1, further comprising:
one or more processors; and
a memory coupled to the one or more processors and storing program instructions that when executed by the one or more processors cause the one or more processors to provide at least: the area correction unit; the estimation unit; the comparison unit; and the first abnormality determination unit.

* * * * *